US011212199B2

(12) United States Patent
Suthar et al.

(10) Patent No.: US 11,212,199 B2
(45) Date of Patent: *Dec. 28, 2021

(54) AUTOMATED PROVISIONING OF RADIOS IN A VIRTUAL RADIO ACCESS NETWORK

(71) Applicant: Cisco Technology, Inc., San Jose, CA (US)

(72) Inventors: Om Prakash Suthar, Bolingbrook, IL (US); Arghya Mukherjee, Acton, MA (US); Santanu Dasgupta, Fremont, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/005,439

(22) Filed: Aug. 28, 2020

(65) Prior Publication Data

US 2020/0396142 A1 Dec. 17, 2020

Related U.S. Application Data

(63) Continuation of application No. 16/364,871, filed on Mar. 26, 2019, now Pat. No. 10,797,968.

(Continued)

(51) Int. Cl.
*H04L 12/24* (2006.01)
*H04W 88/08* (2009.01)
*G06F 9/455* (2018.01)

(52) U.S. Cl.
CPC ...... *H04L 41/5054* (2013.01); *G06F 9/45558* (2013.01); *H04L 41/0893* (2013.01);
(Continued)

(58) Field of Classification Search
CPC ............ H04L 41/5054; H04L 41/5048; H04L 41/0893; H04L 41/0806; H04W 88/085;
(Continued)

(56) References Cited

U.S. PATENT DOCUMENTS 8,295,230 B2  10/2012  Hans et al.
9,985,764 B2   5/2018  Aiba et al.
(Continued)

FOREIGN PATENT DOCUMENTS

WO  2018128875 A1  7/2018
WO  2018144983 A1  8/2018

OTHER PUBLICATIONS

Bob Everson et al., CISCO, "Open vRAN Ecosystem", Sep. 20, 2018, 31 pages.
(Continued)

*Primary Examiner* — Michael Won
(74) *Attorney, Agent, or Firm* — Edell, Shapiro & Finnan, LLC

(57) ABSTRACT

In one example, a Network Functions Virtualization Orchestrator (NFVO) obtains a radio service descriptor defining communication parameters for a radio in a virtual Radio Access Network (vRAN). Based on the radio service descriptor, the NFVO determines whether a virtual Distributed Unit (vDU) that is configured in accordance with the communication parameters and a virtual Centralized Unit (vCU) that is configured in accordance with the communication parameters are already instantiated in the vRAN. If it is determined that the vDU or the vCU is not already instantiated, the NFVO automatically instantiates the vDU or the vCU in the vRAN.

20 Claims, 5 Drawing Sheets

Related U.S. Application Data

(60) Provisional application No. 62/767,732, filed on Nov. 15, 2018.

(52) U.S. Cl.
CPC ....... *H04L 41/5048* (2013.01); *H04W 88/085* (2013.01); *G06F 2009/45595* (2013.01)

(58) Field of Classification Search
CPC ................ H04W 24/02; G06F 9/45558; G06F 2009/45595
See application file for complete search history.

(56) References Cited

U.S. PATENT DOCUMENTS

| | | |
|---|---|---|
| 2002/0178077 A1 | 11/2002 | Katz et al. |
| 2007/0005801 A1 | 1/2007 | Kumar et al. |
| 2014/0092765 A1 | 4/2014 | Agarwal et al. |
| 2014/0280974 A1 | 9/2014 | Corson |
| 2016/0248600 A1 | 8/2016 | Bernstein et al. |
| 2016/0353465 A1 | 12/2016 | Vrzic et al. |
| 2017/0012823 A1 | 1/2017 | Zhu et al. |
| 2017/0063598 A1 | 3/2017 | Zhu et al. |
| 2018/0004576 A1 | 1/2018 | Gokurakuji et al. |
| 2018/0013680 A1 | 1/2018 | Bull et al. |
| 2018/0034781 A1 | 2/2018 | Jaeger et al. |
| 2018/0139091 A1 | 5/2018 | Maeder et al. |
| 2018/0175981 A1 | 6/2018 | Manolakos et al. |
| 2018/0176830 A1 | 6/2018 | Yang et al. |
| 2018/0220318 A1 | 8/2018 | Uemura et al. |
| 2018/0255463 A1 | 9/2018 | Zheng et al. |
| 2018/0270111 A1 | 9/2018 | Oohira et al. |
| 2018/0287696 A1 | 10/2018 | Barbieri et al. |
| 2018/0287894 A1 | 10/2018 | Senarath |
| 2018/0316730 A1 | 11/2018 | Schaefer et al. |
| 2018/0343567 A1 | 11/2018 | Ashrafi |
| 2018/0365076 A1 | 12/2018 | Liu et al. |
| 2019/0007899 A1 | 1/2019 | Vrzic et al. |
| 2019/0058997 A1 | 2/2019 | Futaki et al. |
| 2019/0065232 A1 | 2/2019 | Do et al. |
| 2019/0109766 A1 | 4/2019 | Bodog et al. |
| 2019/0149408 A1* | 5/2019 | Li ................... H04L 12/4641 709/223 |
| 2019/0173964 A1* | 6/2019 | Ni .................... H04L 41/5019 |
| 2019/0238425 A1 | 8/2019 | Mladin et al. |
| 2019/0266012 A1 | 8/2019 | Chou |
| 2020/0076709 A1 | 3/2020 | Stenberg et al. |
| 2021/0022018 A1* | 1/2021 | Belov .................. H04W 8/24 |
| 2021/0058826 A1* | 2/2021 | Mao ............... H04W 28/0933 |
| 2021/0058989 A1* | 2/2021 | Simsek ............. H04W 40/02 |

OTHER PUBLICATIONS

Yuri Demchenko et al., "Enabling Automated Network Services Provisioning for Cloud Based Applications Using Zero Touch Provisioning", 2015 IEEE/ACM 8th International Conference on Utility and Cloud Computing (UCC), https://ieeexplore.ieee.org/abstract/document/7431457/definitions, Dec. 7-10, 2015, 7 pages.

Alex Reznik et al., ETSI, "Cloud RAN and MEC: A Perfect Pairing", ISBN No. 979-10-92620-17-7, First edition, Feb. 2018, 24 pages.

Wind River Systems, Inc., "vRAN: The Next Step in Network Transformation", Nov. 2017, 10 pages.

Intel, "pCR TR 32.864 add US on instantiation of VNF and PNF that forms a gNB", 3rd Generation Partnership Project (3GPP), S5A-170085, Feb. 6, 2017, 5 pages.

International Search Report and Written Opinion in counterpart International Application No. PCT/US2019/060375, dated Feb. 14, 2020, 17 pages.

Gabriel Brown et al., "New Transport Network Architectures for 5G RAN", Heavy Reading, FUJITSU, Oct. 2018, 11 pages.

* cited by examiner

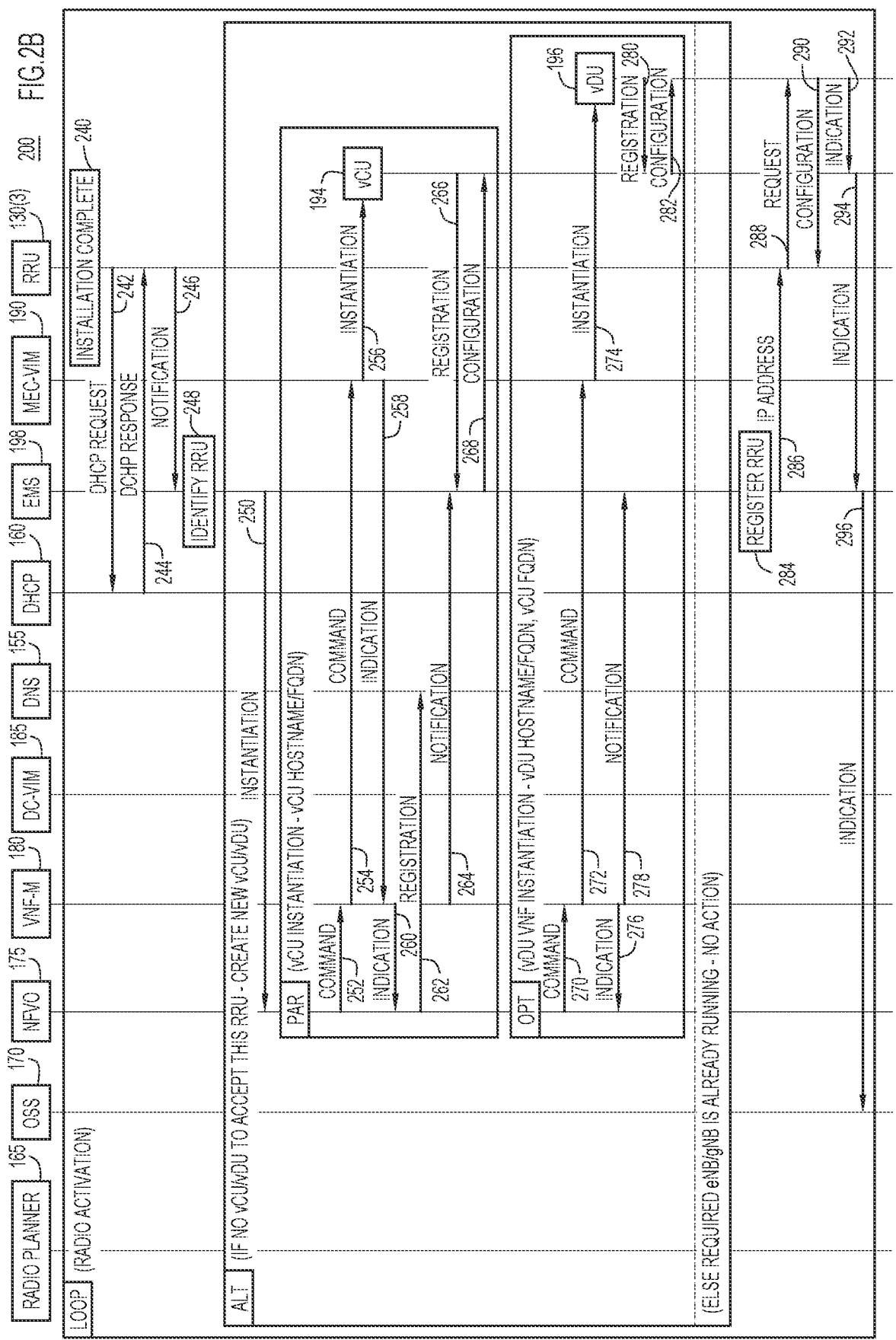

AUTOMATED PROVISIONING OF RADIOS IN A VIRTUAL RADIO ACCESS NETWORK

CROSS REFERENCE TO RELATED APPLICATION

This application is a continuation of U.S. application Ser. No. 16/364,871, filed Mar. 26, 2019, which in turn claims priority to U.S. Provisional Application No. 62/767,732, filed Nov. 15, 2018. The entirety of each of these applications is incorporated herein by reference.

TECHNICAL FIELD

The present disclosure relates to virtual Radio Access Networks (vRANs).

BACKGROUND

Mobile service providers wish to improve the network edge through, for example, enhanced Mobile BroadBand (eMBB), Ultra Reliable and Low Latency Communications (URLLC), and massive Machine Type Communications (mMTC). To that end, providers are currently studying various Fifth Generation (5G) use cases such as virtual Radio Access Networks (vRANs), User Plane Forwarders (UPFs) at or near the edge of the network, content caching, Internet of Things (IoT), edge computing applications, etc.

In particular, mobile providers want to disrupt the RAN architecture by decomposing the traditional and monolithic eNodeB (eNB) into multiple components, where those components are interconnected via open interfaces. Standard bodies and forums such as the 3rd Generation Partnership Project (3GPP), extensible RAN (xRAN), and Open RAN (O-RAN) are defining how such decomposition of the eNB should be accomplished and what those components should be (e.g., Remote Radio Head (RRH) and Base Band Unit (BBU), or Remote Radio Unit (RRU), Distributed Unit (DU), and Central Unit (CU)). These bodies/forums are also defining specifications of the interfaces to interconnect those functions.

Following decomposition, components such as the BBU or the DU and CU may be pulled out of the cell site and placed at an aggregation location to provide benefits from pooling and enhanced coordination to drive better performance at a lower cost point. Mobile operators are also planning to virtualize components such as the BBU or the DU and CU to leverage a common Mobile Edge Computing (MEC) platform and can be instantiated, moved, and scaled up or down in a policy-driven manner.

BRIEF DESCRIPTION OF THE DRAWINGS

FIGS. 2A and 2B together illustrate an example call flow for automatically provisioning radios in a vRAN, according to an example embodiment.

DESCRIPTION OF EXAMPLE EMBODIMENTS

Overview

In one example embodiment, a Network Functions Virtualization Orchestrator (NFVO) obtains a radio service descriptor defining communication parameters for a radio in a virtual Radio Access Network (vRAN). Based on the radio service descriptor, the NFVO determines whether a virtual Distributed Unit (vDU) that is configured in accordance with the communication parameters and a virtual Centralized Unit (vCU) that is configured in accordance with the communication parameters are already instantiated in the vRAN. If it is determined that the vDU or the vCU is not already instantiated, the NFVO automatically instantiates the vDU or the vCU in the vRAN.

EXAMPLE EMBODIMENTS

Virtualization of Radio Access Networks (RANs) is the next major transition coming to RAN architecture. However, the benefits also bring new challenges. One such challenge is how to perform a fully automated provisioning of virtual RAN (vRAN) architecture end-to-end in a complete yet zero-touch manner. There is no standard mechanism for vRAN automation today. As such, presented herein is a solution for vRAN automation.

Figure 1:
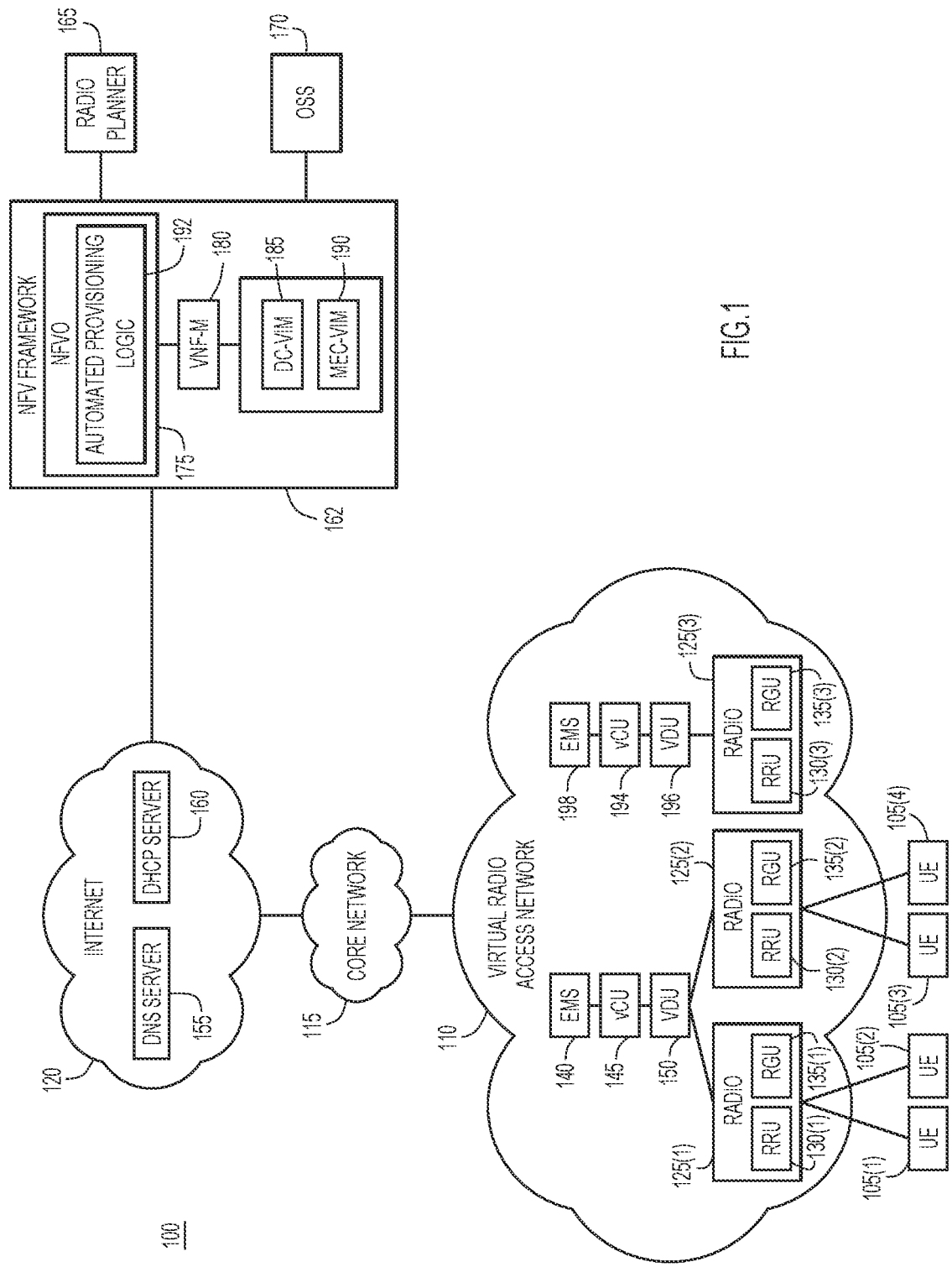
FIG. 1 illustrates a system for automated provisioning of radios in a virtual Radio Access Network (vRAN), according to an example embodiment.

FIG. 1 illustrates an example system 100 for automated radio provisioning. System 100 includes User Equipment (UE) 105(1)-105(4), vRAN 110, core network 115, and Internet 120. UE 105(1)-105(4) may include mobile phones, laptops, connected vehicles, etc. Briefly, vRAN 110 provides UE 105(1)-105(4) access to Internet 120 through core network 115. More specifically, vRAN 110 includes radio 125(1) that wirelessly communicates with UE 105(1) and 105(2) to provide Internet connectivity, and radio 125(2) that wirelessly communicates with UE 105(3) and 105(4) to provide Internet connectivity.

Radios 125(1) and 125(2) may be physical devices in one or more geographic locations. Radio 125(1) includes Remote Radio Unit (RRU) 130(1) and an optional Radio Gateway Unit (RGU) 135(1) that converts an Option 8 split interface input into an Option 7 split interface output if RRU 130(1) cannot present an Option 7 interface natively. Similarly, radio 125(2) includes RRU 130(2) and RGU 135(2). RRUs 130(1) and 130(2) may include antennas, and RGUs 135(1) and 135(2) may include a radio interface (a wireless transceiver) for sending and receiving wireless communications. RRUs 130(1) and 130(2) may have an enhanced Common Public Radio Interface (eCPRI) interface to enable RAN splitting.

vRAN 110 also includes Element Management System (EMS) 140, virtual Centralized Unit (vCU) 145, and virtual Distributed Unit (vDU) 150. EMS 140 includes information such as radio configurations and parameters required to instantiate, provision, integrate and manage the lifecycle(s) of vCU 145, vDU 150, and RRUs 130(1) and 130(2). vCUs 145 and vDU 150 are logical nodes configured to perform eNodeB (eNB)/gNodeB (gNB) functions. The exact functions performed by vCU 145 and vDU 150 may depend on the particular functional split in a given use case. Examples of functions allocated to vCU 145 or vDU 150 may include transfer of user data, mobility control, radio access network sharing, positioning, session management, etc. In one specific example, vDU 150 may host radios 125(1) and 125(2).

Internet 120 includes Domain Name System (DNS) server 155 and Dynamic Host Control Protocol (DHCP) server

160. DNS server 155 is a domain resolution system. DHCP server 160 is an Internet Protocol (IP) address version 4 and/or 6 (IPv4 and/or IPv6) allocation system. DHCP server 160 provides IPv4 or IPv6 addresses required for EMS 140, vCU 145, and/or vDU 150.

In this example, a radio vendor manufactures and ships a new radio 125(3), which includes RRU 130(3) and the optional RGU 135(3). Conventionally, when radio 125(3) connects to vRAN 110, the network administrator/operator would need to manually provision radio 125(3). For example, the network administrator would need to ensure that vCU 145 and vDU 150 are compatible with the hardware/interface capabilities of radio 125(3) (e.g., RRU 130(3) and/or the optional RGU 135(3)). This manual onboarding process would typically take days or even weeks to properly configure vRAN 110. In addition to requiring the network administrator to travel to the physical site of vRAN 110 and perform coordination across teams, the time needed to manually configure vRAN 110 often increases with the number of radios. Although vRAN 110 is shown with only three radios 125(1)-125(3) for simplicity, radios in a vRAN can number in the tens of thousands or even hundreds of thousands. Furthermore, the manual onboarding process is prone to human error because of the large number of network elements and high complexity involved with the configuration.

Accordingly, presented herein is a solution for rapid deployment of vRAN nodes (e.g., vCU 145, vDU 150, etc.) by leveraging automation systems using bootstrapping and zero-touch (automated) provisioning. These automated provisioning techniques may improve the cost of implementing vRAN elements and reduce provisioning/turn-on time by almost 90%. In one example, this solution may be deployed in a multi-vendor network that includes radios, vCUs, and vDUs from different vendors.

As such, system 100 further includes Network Functions Virtualization (NFV) framework 162, radio planner 165, and Operations Support System (OSS) 170. NFV framework 162 includes NFV Orchestrator (NFVO) 175, Virtual Network Functions (VNF) Manager (VNF-M) 180, Data Center Virtual Infrastructure Manager (DC-VIM) 185, and Mobile Edge Computing VIM (MEC-VIM) 190. NFVO 175 includes automated provisioning logic 192 to enable NFVO 175 to automatically instantiate a vCU and vDU suitable for radio 125(3).

Radio planner 165 is a radio planning tool that provides radio provisioning parameters and optimizations for radio access network (RAN) 125(3). OSS 170 is a platform used for managing network elements. NFVO 175 may monitor MEC-VIM 190 resources, monitor capacity available on a Wide Area Network (WAN) (e.g., Internet 120)/Service Level Agreement (SLA), move the workload to the MEC-VIMs of adjacent sites, and dynamically provision the WAN for connectivity to the alternate site(s) to temporarily spin off vRAN workloads. VNF-M 180 may assist in instantiating the vCU and vDU. DC-VIM 185 may be a DC Network Function Virtualization Infrastructure (NFVI) manager for deployment of EMS 140 and other network functions. MEC-VIM 190 is a NFVI manager, and may be located at the edge for deployment of the vDU/vCU/VNF.

In one example, immediately after radio 125(3) is turned on, NFVO 175 automatically obtains a radio service descriptor defining communication parameters for radio 125(3) from radio planner 165. The radio service descriptor may communicate how radio 125(3) can be onboarded. The radio service descriptor is automated to enable deployment of vRAN 110 without any manual intervention from the network administrator. The radio service descriptor may follow any suitable format (e.g., eXtensible Markup Language (XML), Network Configuration Protocol (NETCONF), Representational State Transfer (REST), etc.), and may be defined for multi-vendor vRANs (e.g., if an RRU in a vRAN originates from one vendor and a vDU in the same vRAN originates from another vendor).

The radio service descriptor may include physical radio parameters such as longitude, latitude, RRU height, etc. Alternatively, the radio service descriptor may include Layer 2 parameters such as Ethernet frame, Virtual Local Area Network (VLAN)/Virtual Extensible LAN (VXLAN), Class of Service (CoS), Maximum Transmission Unit (MTU), etc. In another example, the radio service descriptor may include Layer 3 parameters such as IP address, subnetwork, default gateway, Quality of Service (QoS), etc. In still another example, the radio service descriptor may include Radio Frequency (RF) parameters such as Radio Admission Control (RAC), uplink and downlink RF bandwidth, Signal to Noise Ratio (SNR), sector definition, electrical/mechanical tilt, Key Performance Indicator (KPI), etc.

Based on the radio service descriptor, NFVO 175 may determine whether a vDU that is configured in accordance with the communication parameters and a vCU that is configured in accordance with the communication parameters are already instantiated in vRAN 110. For example, NFVO 175 may determine whether vCU 145 and vDU 150 are already configured in accordance with the communication parameters.

In one example, NFVO 175 may intelligently map radio 125(3) (e.g., RRU 130(1)) to properties of a vDU using RF parameters of the vDU, available compute, memory, storage, and/or network resources of the vDU, and/or anticipated bandwidth availability of the vDU. RF parameters may include RAC, uplink and downlink RF bandwidth, SNR, sector definition, electrical/mechanical tilt, etc. Available compute, memory, storage, and/or network resources may be determined based on VNF requirements and available resources. For example, NFVO 175 may check the availability of a Vector Packet Processing (VPP) based vSwitch and/or Single Root Input/Output Virtualization (SR-IOV) capability for a virtual networking requirement. Anticipated bandwidth availability may be determined based on a number of subscribers, average bandwidth/RRU, etc.

If it is determined that vCU 145 and vDU 150 are configured in accordance with the communication parameters, NFVO 175 may allocate vCU 145 and vDU 150 to radio 125(3) (e.g., radio 125(3) may share vCU 145 and vDU 150 with radios 125(1) and 125(2)). However, if it is determined that vCU 145 and vDU 150 are not configured in accordance with the communication parameters, NFVO 175 may automatically instantiate vCU 194 and/or vDU 196 in vRAN 110. vCU 194 and/or vDU 196 may be configured in accordance with the communication parameters from the radio service descriptor. This may enable radio 125(3) to provide coverage for UE via vCU 194 and/or vDU 196. NFVO 175 may also automatically instantiate EMS 198, which is also configured in accordance with the communication parameters from the radio service descriptor.

In a further example, in order to help NFVO 175 properly instantiate vCU 194 and/or vDU 196, the concepts of "affinity rules" and "anti-affinity rules" are introduced. An affinity rule is a pre-existing rule that indicates that a network element (e.g., vCU, vDU, RRU, etc.) can associate with another network element. An anti-affinity rule is a pre-existing rule that indicates that a network element cannot associate with another network element. Affinity rules may be based on physical radio parameters or RF parameters, for example.

NFVO 175 may instantiate vDU 196 in accordance with one or more affinity and/or anti-affinity rules regarding whether a type of vDU 196 can associate with a type of radio 125(3) (that is, whether vDU 196, which has certain specified properties, can associate with radio 125(3), which also has certain specified properties). For example, the capabilities of vDU 150 may not match the hardware/interface capabilities of radio 125(3). Similarly, NFVO 175 may instantiate a vCU 194 in accordance with one or more affinity and/or anti-affinity rules regarding whether a type of vCU 194 can associate with a type of vDU 196 (that is, whether vCU 194, which has certain specified properties, can associate with vDU 196, which also has certain specified properties). Ensuring that radio 125(3) is mapped to the appropriate vDU and the appropriate vDU is mapped to the appropriate vCU enables the chain for proper configuration.

Affinity rules may be applied to high availability vCUs/vDUs and Virtual Machine (VM) or container resources. In one specific example, based on RF planning parameters, NFVO 175 may determine how affinity and anti-affinity rules are to be applied to vCU 194 and/or vDU 196 for high availability. vCUs and/or vDUs serving adjacent cells may be avoided to obtain separate MEC hosts.

Figure 2A:
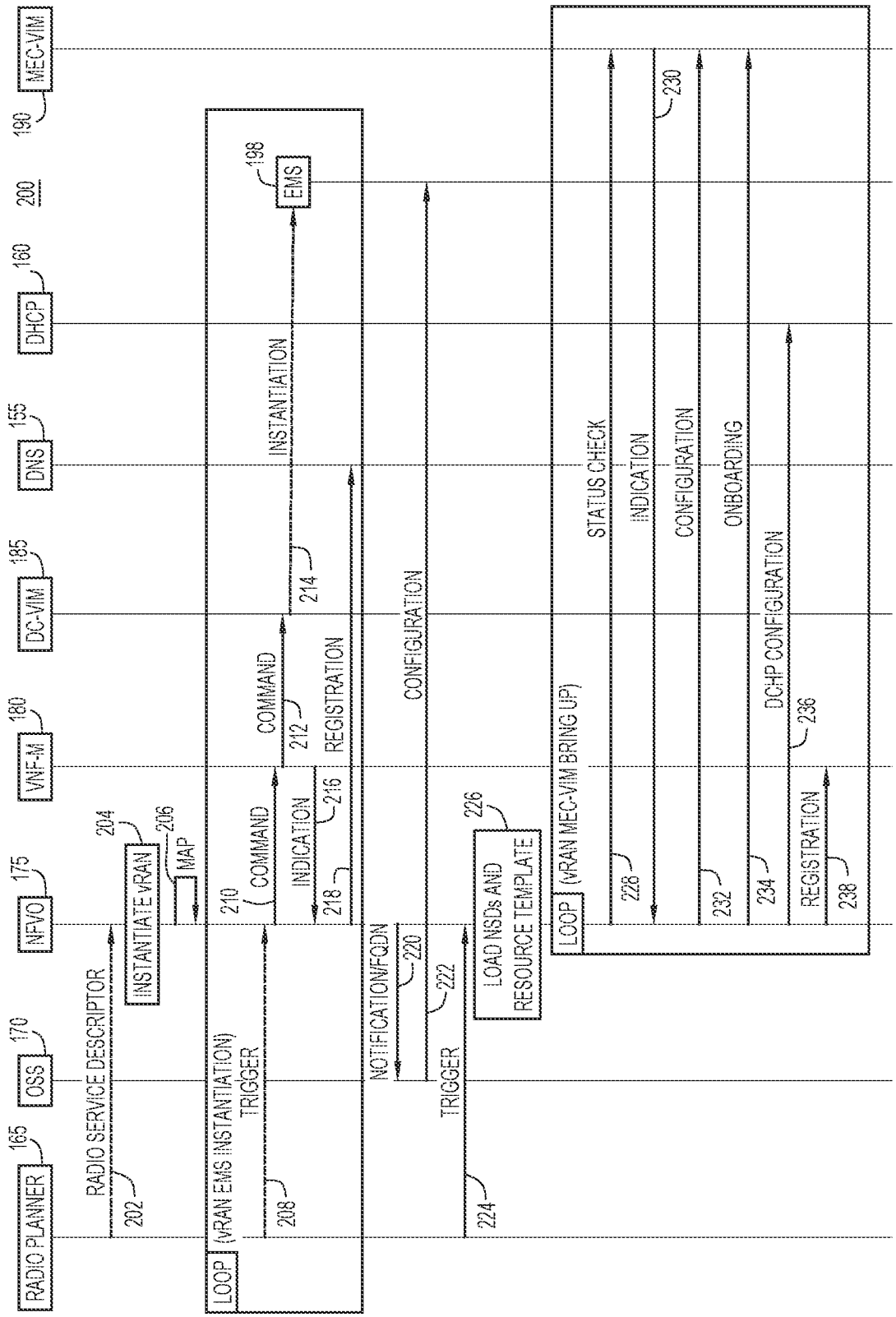

FIGS. 2A and 2B together illustrate an example call flow 200 for automatically provisioning radio 125(3) in vRAN 110. Reference will be made to FIG. 1 for the purposes of describing FIGS. 2A and 2B. Briefly, call flow 200 enables the automated deployment of vRAN elements such as vCU 194, vDU 196, RRU 130(3), etc. Call flow 200 involves communications between RRU 130(3), DNS server 155, DHCP server 160, radio planner 165, OSS 170, NFVO 175, VNF-M 180, DC-VIM 185, MEC-VIM 190, vCU 194, vDU 196, and EMS 198.

Turning first to FIG. 2A, at 202, NFVO 175 obtains a radio service descriptor from radio planner 165. The radio service descriptor defines communication parameters for radio 125(3). At 204, NFVO 175 instantiates vRAN 110, although it will be appreciated that vRAN 110 may have been previously instantiated in order to host radios 125(1) and 125(2). At 206, NFVO 175 maps the communication parameters to properties of vRAN elements such as vCU 194 and vDU 196.

Operations 208-218 relate to instantiation/creation of EMS 198. At 208, NFVO 175 obtains a trigger to instantiate EMS 198, which will be configured in accordance with the communication parameters from the radio service descriptor. At 210, NFVO 175 sends a command to instantiate EMS 198 to VNF-M 180. At 212, VNF-M 180 sends the command to instantiate EMS 198 to DC-VIM 185. At 214, DC-VIM 185 instantiates EMS 198. At 216, NFVO 175 obtains an indication that EMS 198 has been instantiated from VNF-M 180. At 218, NFVO 175 registers a Fully Qualified Domain Name (FQDN) for the IP address of EMS 198 with DNS server 155.

At 220, NFVO 175 provides, to OSS 170, a notification that EMS 198 has been instantiated with the FQDN. At 222, OSS 170 configures parameters of EMS 198. This may include mapping MEC-VIM 190 and the serial number of RRU 130(3). OSS 170 may also perform a sanity check to ensure that EMS 198 is configured properly.

At 224, NFVO 175 obtains, from radio planner 165, a trigger to instantiate vCU 194 and vDU 196. vCU 194 and vDU 196 will be configured in accordance with the communication parameters from the radio service descriptor. At 226, NFVO 175 loads Network Service Descriptors (NSDs) for vCU 194 and vDU 196 and a resource template (e.g., IP address, Virtual Local Area Network (VLAN), routing, etc.).

Operations 228-238 relate to instantiation of MEC-VIM 190. Configuration upload may occur on management switches and the WAN router. MEC-VIM 190 is brought up and ready for VNFs (e.g., vCU 194 and/or vDU 196) of vRAN 110. At 228, NFVO 175 checks the status of MEC-VIM 190. In this example, at 230, NFVO 175 obtains an indication that MEC-VIM 190 is already deployed and running. It will be appreciated, however, that in other examples in which MEC-VIM 190 does not yet exist, NFVO 175 may create MEC-VIM 190.

At 232, NFVO 175 configures various features of MEC-VIM 190. The features may include tenants, networks, flavors, keystone users, etc. At 234, NFVO 175 may onboard a vCU and vDU on MEC-VIM 190. At 236, NFVO 175 provides a DHCP configuration for MEC-VIM 190 that specifies the FQDN of EMS 198. At 238, NFVO 175 registers MEC-VIM 190 with VNF-M 180.

With reference now to FIG. 2B, at 240, installation of RRU 130(3) is complete, and RRU 130(3) boots up and identifies its serial number. At 242, RRU 130(3) sends a DHCP request to DHCP server 160. The DHCP request may identify the device type of RRU 130(3) as macro. At 244, RRU 130(3) obtains a DHCP response from DHCP server 160. The DHCP response may identify the IP address and FQDN of EMS 198. At 246, RRU 130(3) provides a notification to EMS 198 that RRU 130(3) is powered on. The notification may include the serial number and device type of RRU 130(3). At 248, EMS 198 identifies RRU 130(3) based on the serial number of RRU 130(3) and maps RRU 130(3) to MEC-VIM 190.

Operations 250-282 are performed if no vCU or vDU that is configured in accordance with the communication parameters from the radio service descriptor is already instantiated. Operations 254-270 relate to instantiation of vCU 194, and operations 272-282 relate to instantiation of vDU 196. Operations 250-282 need not be performed if the vCU and vDU are already instantiated.

At 250, NFVO 175 obtains, from EMS 198, an indication to instantiate the eNB/gNB Network Service (NS) based on the NSD. The indication may include the hostname(s) and/or FQDN(s) of vCU 194 and/or vDU 196, the site identifier of MEC-VIM 190, etc. At 252, NFVO 175 provides, to VNF-M 180, a command to instantiate vCU 194. At 254, VNF-M 180 sends, to MEC-VIM 190, a command to instantiate vCU 194. At 256, MEC-VIM 190 instantiates vCU 194. At 258, MEC-VIM 190 provides an indication to VNF-M 180 that vCU 194 has been instantiated. At 260, NFVO 175 obtains an indication from VNF-M 180 that vCU 194 has been instantiated. At 262, NFVO 175 registers the FQDN of vCU 194 with DNS server 155. At 264, VNF-M 180 provides a notification to EMS 198 that vCU 194 is up. At 266, vCU 194 registers the FQDN and IP address of vCU 194 with EMS 198. At 268, EMS 198 configures vCU 194.

At 270, NFVO 175 provides a command to instantiate vDU 196 to VNF-M 180. At 272, VNF-M 180 sends a command to instantiate vDU 196 to MEC-VIM 190. At 274, MEC-VIM 190 instantiates vDU 196. At 276, NFVO 175 obtains an indication from VNF-M 180 that vDU 196 has been instantiated. At 278, VNF-M 180 provides a notification to EMS 198 that vDU 196 is up. At 280, vDU 196 registers with vCU 194. At 282, vCU 194 configures vDU 196.

At 284, EMS registers RRU 130(3) and, at 286, provides the IP address of vDU 196 to RRU 130(3). At 288, RRU 130(3) requests vDU 196 to configure RRU 130(3). At 290, vDU 196 configures RRU 130(3). At 292, vDU 196 sends an indication that RRU 130(3) is in service to vCU 194. At 294, vCU 194 sends an indication that RRU 130(3) is in service to EMS 198. At 296, EMS 198 sends an indication that RRU 130(3) is in service to OSS 170. OSS 170 is thereby notified that radio 125(3) is onboarded and ready for monitoring.

Figure 3:
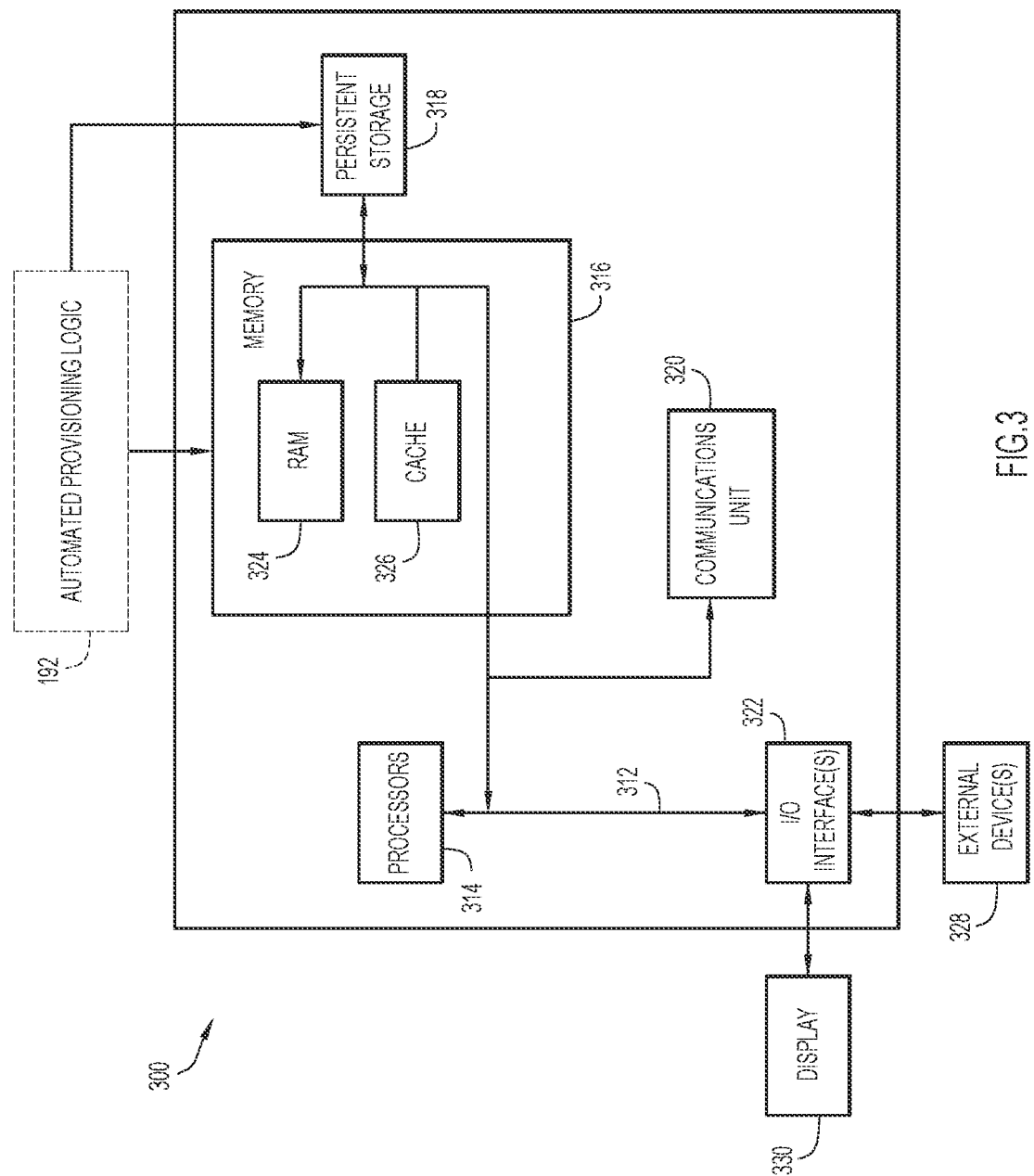
FIG. 3 is a block diagram of a device configured to automatically provision radios in a vRAN, according to an example embodiment.

FIG. 3 illustrates a hardware block diagram of a computing device 300 that may perform the functions of any of the servers or computing or control entities referred to herein in connection with automated provisioning of radios. It should be appreciated that FIG. 3 provides only an illustration of one embodiment and does not imply any limitations with regard to the environments in which different embodiments may be implemented. Many modifications to the depicted environment may be made.

As depicted, the device 300 includes a bus 312, which provides communications between computer processor(s) 314, memory 316, persistent storage 318, communications unit 320, and input/output (I/O) interface(s) 322. Bus 312 can be implemented with any architecture designed for passing data and/or control information between processors (such as microprocessors, communications and network processors, etc.), system memory, peripheral devices, and any other hardware components within a system. For example, bus 312 can be implemented with one or more buses.

Memory 316 and persistent storage 318 are computer readable storage media. In the depicted embodiment, memory 316 includes random access memory (RAM) 324 and cache memory 326. In general, memory 316 can include any suitable volatile or non-volatile computer readable storage media. Instructions for the automated provisioning logic 192 may be stored in memory 316 or persistent storage 318 for execution by processor(s) 314.

One or more programs may be stored in persistent storage 318 for execution by one or more of the respective computer processors 314 via one or more memories of memory 316. The persistent storage 318 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 318 may also be removable. For example, a removable hard drive may be used for persistent storage 318. Other examples include optical and magnetic disks, thumb drives, and smart cards that are inserted into a drive for transfer onto another computer readable storage medium that is also part of persistent storage 318.

Communications unit 320, in these examples, provides for communications with other data processing systems or devices. In these examples, communications unit 320 includes one or more network interface cards. Communications unit 320 may provide communications through the use of either or both physical and wireless communications links.

I/O interface(s) 322 allows for input and output of data with other devices that may be connected to computer device 300. For example, I/O interface 322 may provide a connection to external devices 328 such as a keyboard, keypad, a touch screen, and/or some other suitable input device. External devices 328 can also include portable computer readable storage media such as database systems, thumb drives, portable optical or magnetic disks, and memory cards.

Software and data used to practice embodiments can be stored on such portable computer readable storage media and can be loaded onto persistent storage 318 via I/O interface(s) 322. I/O interface(s) 322 may also connect to a display 330. Display 330 provides a mechanism to display data to a user and may be, for example, a computer monitor.

Figure 4:
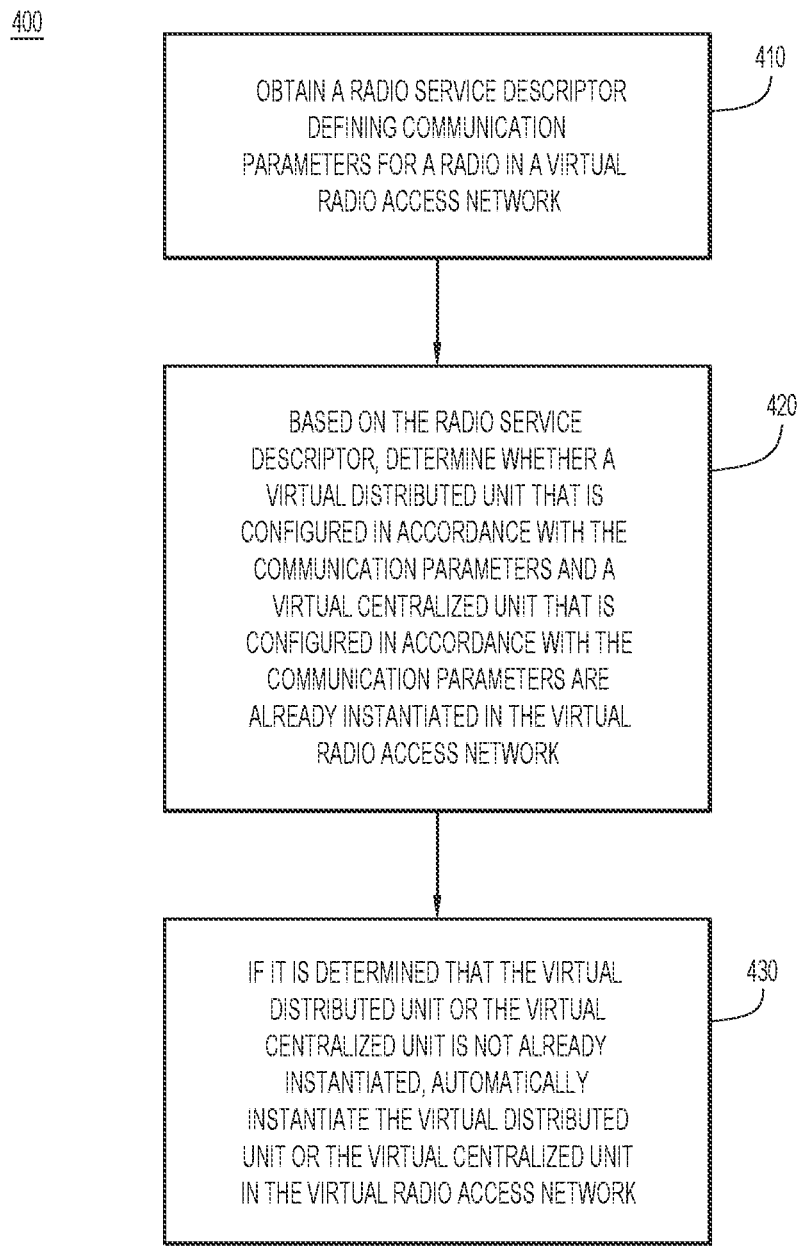
FIG. 4 is a flowchart of a method for automatically provisioning radios in a vRAN, according to an example embodiment.

FIG. 4 is a flowchart of a method 400 for automatically provisioning radios in a vRAN. Method 400 may be performed by NFVO 175 as implemented on computing device 300, for example. At 410, NFVO 175 obtains a radio service descriptor defining communication parameters for a radio in a vRAN. At 420, based on the radio service descriptor, NFVO 175 determines whether a vDU that is configured in accordance with the communication parameters and a vCU that is configured in accordance with the communication parameters are already instantiated in the vRAN. At 430, if it is determined that the vDU or the vCU is not already instantiated, NFVO 175 automatically instantiates the vDU or the vCU in the vRAN.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The present embodiments may employ any number of any type of user interface (e.g., Graphical User Interface (GUI), command-line, prompt, etc.) for obtaining or providing information (e.g., data relating to providing enhanced delivery options), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In one form, a method is provided. The method comprises: obtaining a radio service descriptor defining communication parameters for a radio in a virtual Radio Access Network; based on the radio service descriptor, determining whether a virtual distributed unit that is configured in accordance with the communication parameters and a virtual centralized unit that is configured in accordance with the communication parameters are already instantiated in the virtual Radio Access Network; and if it is determined that the virtual distributed unit or the virtual centralized unit is not already instantiated, automatically instantiating the virtual distributed unit or the virtual centralized unit in the virtual Radio Access Network.

In one example, obtaining the radio service descriptor includes obtaining physical radio parameters. In another example, obtaining the radio service descriptor includes obtaining Layer 2 radio parameters. In yet another example, obtaining the radio service descriptor includes obtaining Layer 3 radio parameters. In still another example, obtaining the radio service descriptor includes obtaining radio frequency parameters.

In one example, instantiating the virtual distributed unit includes instantiating the virtual distributed unit in accordance with one or more pre-existing rules regarding whether a type of the virtual distributed unit can associate with a type of the radio. In another example, instantiating the virtual centralized unit includes instantiating the virtual centralized unit in accordance with one or more pre-existing rules regarding whether a type of the virtual centralized unit can associate with a type of the virtual distributed unit.

In one example, the method further comprises automatically instantiating, in the virtual Radio Access Network, an element management system that is configured in accordance with the communication parameters.

In one example, determining whether the virtual distributed unit is already instantiated includes determining whether the virtual distributed unit is already instantiated based on radio frequency parameters of the virtual distributed unit. In another example, determining whether the virtual distributed unit is already instantiated includes determining whether the virtual distributed unit is already instantiated based on available compute, memory, storage, and/or network resources of the virtual distributed unit. In yet another example, determining whether the virtual distributed unit is already instantiated includes determining whether the virtual distributed unit is already instantiated based on anticipated bandwidth availability of the virtual distributed unit.

In another form, an apparatus is provided. The apparatus comprises: a communication interface configured to obtain and/or provide network communications; and a processor coupled to the communication interface, wherein the processor is configured to: obtain a radio service descriptor defining communication parameters for a radio in a virtual Radio Access Network; based on the radio service descriptor, determine whether a virtual distributed unit that is configured in accordance with the communication parameters and a virtual centralized unit that is configured in accordance with the communication parameters are already instantiated in the virtual Radio Access Network; and if it is determined that the virtual distributed unit or the virtual centralized unit is not already instantiated, automatically instantiate the virtual distributed unit or the virtual centralized unit in the virtual Radio Access Network.

In another form, one or more non-transitory computer readable storage media are provided. The non-transitory computer readable storage media are encoded with instructions that, when executed by a processor, cause the processor to: obtain a radio service descriptor defining communication parameters for a radio in a virtual Radio Access Network; based on the radio service descriptor, determine whether a virtual distributed unit that is configured in accordance with the communication parameters and a virtual centralized unit that is configured in accordance with the communication parameters are already instantiated in the virtual Radio Access Network; and if it is determined that the virtual distributed unit or the virtual centralized unit is not already instantiated, automatically instantiate the virtual distributed unit or the virtual centralized unit in the virtual Radio Access Network.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at one or more processors:
   obtaining a radio service descriptor defining communication parameters for a radio in a virtual Radio Access Network;
   based on the radio service descriptor, determining whether a virtual distributed unit that is configured in accordance with the communication parameters and a virtual centralized unit that is configured in accordance with the communication parameters are already instantiated in the virtual Radio Access Network based at least in part on a resource availability of the virtual distributed unit; and
   if it is determined that the virtual distributed unit or the virtual centralized unit is not already instantiated in the virtual Radio Access Network, automatically instantiating the virtual distributed unit or the virtual centralized unit in the virtual Radio Access Network.

2. The method of claim 1, further comprising:
   monitoring the virtual distributed unit or the virtual centralized unit based on one or more service level agreements.

3. The method of claim 1, further comprising:
   deploying one or more container workloads.

4. The method of claim 1, wherein automatically instantiating the virtual distributed unit or the virtual centralized unit in the virtual Radio Access Network includes:
   automatically instantiating the virtual distributed unit or the virtual centralized unit in a network function virtualization infrastructure.

5. The method of claim 1, wherein the resource availability of the virtual distributed unit includes a compute resource availability of the virtual distributed unit.

6. The method of claim 1, wherein the resource availability of the virtual distributed unit includes a memory resource availability of the virtual distributed unit.

7. The method of claim 1, wherein the resource availability of the virtual distributed unit includes a storage resource availability of the virtual distributed unit.

8. The method of claim 1, wherein the resource availability of the virtual distributed unit includes an input/output resource availability of the virtual distributed unit.

9. An apparatus comprising:
   a communication interface configured to obtain and/or provide network communications; and
   a processor coupled to the communication interface, wherein the processor is configured to:
   obtain a radio service descriptor defining communication parameters for a radio in a virtual Radio Access Network;
   based on the radio service descriptor, determine whether a virtual distributed unit that is configured in accordance with the communication parameters and a virtual centralized unit that is configured in accordance with the communication parameters are already instantiated in the virtual Radio Access Network based at least in part on a resource availability of the virtual distributed unit; and
   if it is determined that the virtual distributed unit or the virtual centralized unit is not already instantiated in the virtual Radio Access Network, automatically instantiate the virtual distributed unit or the virtual centralized unit in the virtual Radio Access Network.

10. The apparatus of claim 9, wherein the processor is further configured to:
    monitor the virtual distributed unit or the virtual centralized unit based on one or more service level agreements.

11. The apparatus of claim 9, wherein the processor is further configured to:
    deploy one or more container workloads.

12. The apparatus of claim 9, wherein the processor is configured to:
    automatically instantiate the virtual distributed unit or the virtual centralized unit in a network function virtualization infrastructure.

13. The apparatus of claim 9, wherein the resource availability of the virtual distributed unit includes a compute resource availability of the virtual distributed unit.

14. The apparatus of claim 9, wherein the resource availability of the virtual distributed unit includes a memory resource availability of the virtual distributed unit.

15. The apparatus of claim 9, wherein the resource availability of the virtual distributed unit includes a storage resource availability of the virtual distributed unit.

16. The apparatus of claim 9, wherein the resource availability of the virtual distributed unit includes an input/output resource availability of the virtual distributed unit.

17. One or more non-transitory computer readable storage media encoded with instructions that, when executed by a processor, cause the processor to:
    obtain a radio service descriptor defining communication parameters for a radio in a virtual Radio Access Network;
    based on the radio service descriptor, determine whether a virtual distributed unit that is configured in accordance with the communication parameters and a virtual centralized unit that is configured in accordance with the communication parameters are already instantiated in the virtual Radio Access Network based at least in part on a resource availability of the virtual distributed unit; and if it is determined that the virtual distributed unit or the virtual centralized unit is not already instantiated in the virtual Radio Access Network, automatically instantiate the virtual distributed unit or the virtual centralized unit in the virtual Radio Access Network.

18. The one or more non-transitory computer readable storage media of claim 17, wherein the instructions further cause the processor to:

monitor the virtual distributed unit or the virtual centralized unit based on one or more service level agreements.

19. The one or more non-transitory computer readable storage media of claim 17, wherein the instructions further cause the processor to:

deploy one or more container workloads.

20. The one or more non-transitory computer readable storage media of claim 17, wherein the instructions cause the processor to:

automatically instantiate the virtual distributed unit or the virtual centralized unit in a network function virtualization infrastructure.

\* \* \* \* \*